(12) United States Patent
Nopper et al.

(10) Patent No.: US 8,707,793 B2
(45) Date of Patent: Apr. 29, 2014

(54) SENSOR SYSTEM HAVING A MAGNETOELASTIC DEFORMATION ELEMENT

(75) Inventors: Reinhard Nopper, Ditzingen (DE); Denis Gugel, Gerlingen (DE); Andreas Arlt, Marbach, DE (US); Klaus Walter, Bietigheim-Bissingen (DE); Frank Schatz, Kornwestheim (DE); Janpeter Wolff, Gerlingen (DE)

(73) Assignee: Robert Bosch GmbH, Stuttgart (DE)

( * ) Notice: Subject to any disclaimer, the term of this patent is extended or adjusted under 35 U.S.C. 154(b) by 953 days.

(21) Appl. No.: 12/624,580

(22) Filed: Nov. 24, 2009

(65) Prior Publication Data

US 2010/0134123 A1 Jun. 3, 2010

(30) Foreign Application Priority Data

Nov. 27, 2008 (DE) .................. 10 2008 044 125

(51) Int. Cl.
*G01L 9/10* (2006.01)

(52) U.S. Cl.
USPC ............................................. 73/728; 73/722

(58) Field of Classification Search
USPC .............................. 73/728, 722; 324/659, 209
See application file for complete search history.

(56) References Cited

U.S. PATENT DOCUMENTS

| | | | | | |
|---|---|---|---|---|---|
| 2,557,393 | A | * | 6/1951 | Rifenbergh | 73/862.333 |
| 4,412,454 | A | * | 11/1983 | Yamashita et al. | 73/728 |
| 4,938,069 | A | * | 7/1990 | Shoji et al. | 73/728 |
| 5,165,284 | A | * | 11/1992 | Shoji et al. | 73/728 |
| 5,297,439 | A | * | 3/1994 | Tyren et al. | 73/779 |
| 5,303,595 | A | * | 4/1994 | Shoji et al. | 73/728 |
| 6,286,361 | B1 | * | 9/2001 | Jones et al. | 73/24.05 |
| 6,539,806 | B2 | * | 4/2003 | Wright | 73/703 |
| 6,622,577 | B1 | * | 9/2003 | Uras | 73/862.69 |
| 7,104,137 | B2 | * | 9/2006 | Baudendistel et al. | 73/722 |
| 2004/0093951 | A1 | * | 5/2004 | Viola et al. | 73/728 |

FOREIGN PATENT DOCUMENTS

| | | |
|---|---|---|
| CN | 1768255 | 5/2006 |
| DE | 29 28 617 | 1/1981 |
| DE | 10 2006 018 482 | 11/2006 |
| EP | 0 450 933 | 4/1991 |
| JP | 2005241567 | 9/2005 |
| WO | WO2006/117293 | 11/2006 |

* cited by examiner

*Primary Examiner* — Lisa Caputo
*Assistant Examiner* — Jonathan Dunlap
(74) *Attorney, Agent, or Firm* — Kenyon & Kenyon LLP

(57) ABSTRACT

A sensor system includes: an at least partially magnetoelastic deformation element for measuring pressures, caused by a fluid, that are able to be applied to the magnetoelastic deformation element; and a magnetic circuit formed via a magnetic flux feedback and having a sensor unit and an evaluation unit. The sensor unit is positioned at the deformation element and the evaluation unit having an evaluation coil is structurally separated from, yet inductively coupled to, the sensor unit. The sensor unit has a sensor coil positioned on the deformation element and the evaluation unit has the evaluation coil that is inductively coupled to the sensor coil, the sensor coil forms a resonant circuit, using its own parasitic capacitance or using an additional capacitance, which is able to be energized by the evaluation coil in free resonance with strong or weak inductive coupling by a magnetic circuit enclosing the two coils.

10 Claims, 3 Drawing Sheets

SENSOR SYSTEM HAVING A MAGNETOELASTIC DEFORMATION ELEMENT

FIELD OF THE INVENTION

The present invention relates to a sensor system having a magnetoelastic deformation element, particularly for measuring hydraulic or other pressures, brought on by a fluid, which have been applied to the magnetoelastic deformation element.

BACKGROUND INFORMATION

It is generally known that in the case of a deformation element made of ferromagnetic materials, for instance, of a Ni—Fe alloy, the magnetoelastic effect is able to be evaluated to the effect that the permeability of the ferromagnetic material is a function of the effective mechanical stress on the deformation element. Thus, if tensile or pressure forces act as deformation forces, the magnetic properties of the stressed material changes.

Furthermore, it is customary, for measuring hydraulic pressures in motor vehicles, for instance, in hydraulic brake systems, that as accurate as possible a recording of the pressure is able to be carried out in a signal form that makes possible further processing in an electronic control unit, for instance, in antilock systems.

A pressure sensor is described in European Patent No. EP 0615118 which makes use of a magnetostriction effect of an amorphous magnetic alloy, made up, for instance, of the substances Fe—Si—B—Cr, a deformation element being present, here too, to which pressure is applied. Furthermore, a reference chamber is present which does not experience any pressure application, and two detection coils are present for measuring the permeability change of the magnetostrictive or the magnetoelastic layer, as well as a magnetic feedback path. The actual sensor element itself is made up only of passive components, in this context, and is connected by cable to an evaluation circuit and a drive circuit.

Such a system is also described in Japanese Patent No. JP-2005241567, in which a magnetostrictive element is located in a liquid or gaseous medium that has a pressure applied to it, and in which the permeability change is measured from the outside, through the wall of the pressure element, using a coil.

Moreover, a system is described in PCT International Patent Publication No. WO 2006/117293 in which there is also a pressure element present, the pressure element either being made of a magnetoelastic material itself, being furnished with a magnetoelastic layer, or a magnetoelastic deformation element is situated in the pressure element. The detection of the permeability change takes place, here too, using coils or, alternatively, using Hall sensors in combination with a field-generating element.

It is known in addition, from the last-named related art, that coils and flux guidances may be pushed over the deformation element, whereby a two-part or multiple-part capability of the sensor system is achieved. Consequently, it is known from this, as seen for itself, that a separation of a hydraulic unit and an electronic unit is possible, without having to reserve a plug/contact system for the electrical contacting.

This known form of the separation of the components hydraulic unit and electronic unit has a disadvantage, however, inasmuch as the coil and the flux guidance have to be plugged onto the deformation element, and consequently, during the transition of the flux guidance to the deformation element (magnetic circuit), a gap is created. A change in the gap length during operation, that often cannot be prevented, has the effect of a relatively drastic change in the effective permeability, that may enter into the measuring signal.

SUMMARY OF THE INVENTION

The present invention relates to a sensor system having an at least partially magnetoelastic deformation element for measuring pressures, caused by a fluid, that are applied to the magnetoelastic deformation element, having a magnetic circuit formed by a magnetic flux guidance and having a sensor unit and an evaluation unit. According to the present invention, the sensor unit is positioned at the deformation element and the receiver unit or evaluation unit is coupled inductively with the sensor unit using an evaluation coil.

In the sensor systems known up to now, depending on the geometry and the material properties, gaps have to be produced in the magnetic circuit that have to be 10 μm or smaller. This requires production precision which, for an electronic unit as evaluation unit, is not acceptable, both with respect to production costs and the handling of the assembly, so that such a separation of hydraulic unit or sensor unit and electronic unit are often not implementable.

Consequently, using the present invention, the object is attained of setting forth a simply implementable separation of electronics and a hydraulic or sensor unit, inclusive perhaps of a clearance in air/gap and possible evaluation methods. The present invention makes possible a separation of the above-mentioned units in conjunction with a very accurate measuring method, which prevents geometric tolerances of a sensor coil and/or evaluation coil and particularly of the feedback to the magnetoelastic element from leading to significant changes in the signal which could erroneously be interpreted as a pressure.

In a particularly advantageous manner, the sensor unit, in this instance, has a sensor coil positioned at the deformation element and the receiver unit has an evaluation coil that is inductively coupled to the sensor coil. The sensor coil is able to form a resonant circuit, in this context, using its own parasitic capacitance or using an additional capacitance, which is able to be energized by the evaluation coil in free resonance with strong inductive coupling by a magnetic circuit enclosing both coils, the resonant frequency being then able to be determined in the evaluation unit.

The resonant frequency may, for instance, be ascertained in a simple manner with the aid of the phase zero crossing of the impedance of the evaluation coil, and is influenced, in this context, by the magnetic properties of the deformation element that is deformed by the pressure, from which a measuring value may be derived for the pressure in the deformation element.

According to one alternative, the sensor element also forms a resonant circuit using its own parasitic capacitance or using an additional capacitance, which is, however, able to be energized by the evaluation coil in free resonance with weak inductive coupling by a magnetic circuit enclosing the sensor coil, which is weakly coupled to the evaluation coil via an air gap, here too, the resonant frequency being determinable via the evaluation unit. The resonant frequency may also be determined, for example, using the phase and/or the amplitude of the impedance of the resonant circuit energized by a variable frequency.

The particular advantages of the present invention are to be seen in that the electronics of the evaluation unit are able to be structurally separated to a great extent from the sensor unit, the geometric tolerances being deliberately held to be large by the concept shown. The critical components, in this instance, namely the sensor coil and the magnetic flux guidance are firmly connected to the hydraulic or the sensor unit. Because of this, a great geometric faithfulness of the components may be achieved, solely by design and production, independently of the procedure of assembly of the units. The transmission of the measuring signal then takes place to a second coil, which may be designated as receiver coil or evaluation coil that is connected to the evaluation unit.

As was mentioned above, two concepts are possible for the transmission from coil to coil. On the one hand, strong coupling may be provided, in which the evaluation coil is positioned within the flux guidance. On the other hand, weak coupling may be provided in which the evaluation coil is deliberately positioned outside the magnetic circuit, and only utilizes small stray field proportions for the coupling at the open gap of the flux guidance. In both cases an evaluation concept is used, that is adapted to the respective coupling, which has a low sensitivity with respect to changes in the coupling strength. The gap is always selected to be big enough so that tolerances in the gap geometry have no effect on the measuring signal.

With the aid of another specific embodiment of the present invention, it is provided that the sensor unit and the receiver unit are also coupled via a magnetic circuit to a flux feedback, the evaluation coil being, however, wound around the flux feedback, and a permeability change effected by the pressure application of the deformation element, and thus a change in the inductance of the evaluation coil, is able to be determined.

On the one hand, the flux feedback, in this case, is able to be mechanically inserted into the magnetic circuit, having an already wound evaluation coil, and the insertion of the flux feedback and the connection to a closed magnetic circuit may then be effected via a correspondingly wedge-shaped or rod-hole-shaped connection; on the other hand, the flux feedback may also be fixedly connected to the magnetic circuit, and the evaluation coil is then subsequently wound around the flux feedback.

Consequently, using these specific embodiments, a structural dimension-based separation of the electronic unit or the evaluation unit from the hydraulic unit or the sensor unit may also be advantageously achieved, which is selected so that the gaps that occur make possible a sufficient flux guidance.

The joining together of the two previously described units advantageously takes place, in the last described specific embodiments, by closing the magnetic circuit made up of the magnetoelastic deformation element in the hydraulic unit or the sensor unit and a magnetic flux feedback via a core material having a mounted evaluation coil as a component of the electronic unit or the evaluation unit. Alternatively, as was described above, the winding of the evaluation coil as a component of the electronic unit may take place via a deformation element already developed as a closed flux guiding core in the hydraulic unit or the sensor unit.

DETAILED DESCRIPTION

Figure 1:
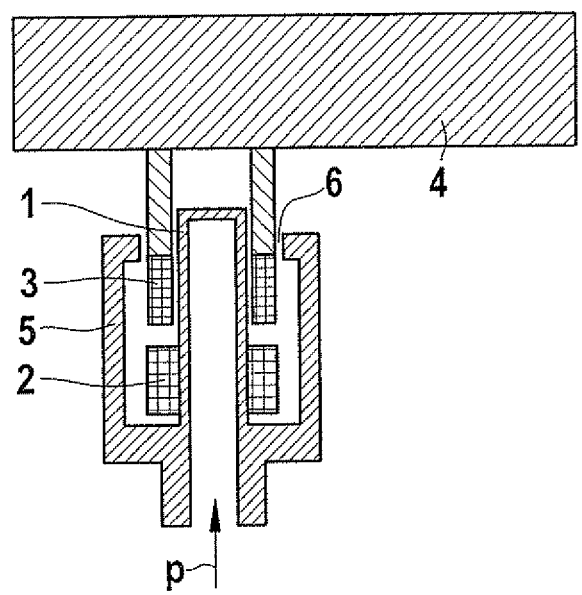
FIG. 1 shows a schematic section through a sensor system having a magnetoelastic deformation element for pressure measurement and a sensor unit and an evaluation unit, which are strongly coupled inductively.

FIG. 1 shows a sensor system having a magnetoelastic deformation element 1 as the pressure element for the pressure measurement, and a sensor unit which is made up, in this instance, essentially of a sensor coil 2 wound onto deformation element 1. An evaluation unit is made up essentially of an evaluation coil 3, which is connected to an electronic circuit on a printed circuit board 4. Strong inductive coupling is achieved via a magnetic flux feedback 5, deformation element 1 and magnetic flux feedback 5 forming a magnetic circuit, in this context.

This magnetic circuit is interrupted by a specified gap 6 of 1 mm or more, for example, so that, because of this gap 6, evaluation coil 3 is able to be pushed into the magnetic circuit, and as a result there exists a strong coupling between the two coils 2 and 3. The fixed-position sensor coil 2, in this context, forms a resonant circuit using its own parasitic capacitance or using an additional capacitance. This resonant circuit is able to be energized by evaluation coil 3 in a self-regulating manner, in free resonance, evaluation coil 3 then being able to read out the resonant frequency, as described in the introductory part of the specification, for example, using the phase zero crossing of the impedance, which is able to be measured on the receiver side in the evaluation unit. Because of the strong coupling, the resonant frequency is determined essentially by the resonant circuit. That being the case, the positioning of evaluation coil 3 is noncritical. The resonant frequency of the resonant circuit depends on the capacitance used and on the inductance of sensor coil 2. The inductance of sensor coil 2, in turn, is a function of the magnetoelastic components and the components that have stress applied to them by pressure p, in the magnetic circuit.

Magnetoelastic pressure elements, magnetoelastic coated pressure elements or magnetoelastic elements that are present in the medium may be used as deformation element 1. The magnetoelastic proportion in the overall magnetic circuit should be as large as possible, in this context, so that the pressure-dependent change of this component effects as large as possible a change in the resonant frequency. The wall thickness of deformation element 1 may be optimized so as to optimize the signal, in this instance, and the permeability of the magnetoelastic material may be optimized by a suitable selection of the material.

Magnetic flux feedback 5 may be made of the same material as deformation element 1, but, if there is a suitable joining technique, it may be produced from a different magnetic material which could be more suitable for producing an optimum magnetic circuit. Suitable joining technique means, in this case, that gap 6, that is created in response to the joining, has to remain the same over the whole operation and service life.

Figure 2:
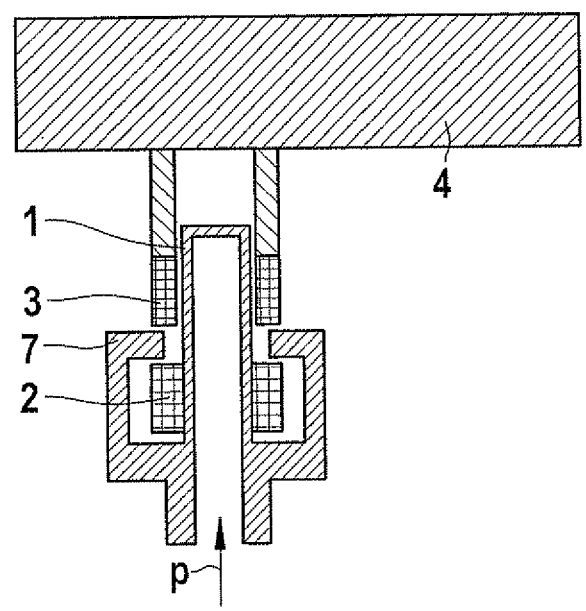
FIG. 2 shows a schematic section through a sensor system having a magnetoelastic deformation element for pressure measurement and a sensor unit and an evaluation unit, which are weakly coupled inductively.

FIG. 2 shows an exemplary embodiment having weak inductive coupling between sensor coil 2 and evaluation coil 3, components having equal functions, in this case, being provided with the same reference numerals. In contrast to the exemplary embodiment as in FIG. 1, evaluation coil 3 is situated outside the magnetic circuit, in this instance, since only one magnetic flux feedback 7 is present, that encloses sensor coil 2.

Although the magnetic circuit is not completely closed, according to FIG. 2, there is nevertheless a sufficient interaction between the two coils 2 and 3. Fixedly positioned sensor coil 2, here too, forms a resonant circuit, again using parasitic capacitances or additional capacitances. The resonant circuit is only able to be energized, for example, using a variable frequency, and the resulting impedance is only able to be evaluated, in a manner known per se, with respect to the phase and/or the amplitude. The resonant frequency is then able to be determined from the frequency response characteristic of the evaluated impedance. The positioning of evaluation coil 3, in turn, is not important, since the determined resonant frequency depends only unimportantly on the position of evaluation coil 3. With reference to the selection of material for the magnetic circuit, the same statement applies as for the concept shown in FIG. 1, having strong inductive coupling.

Figure 3:
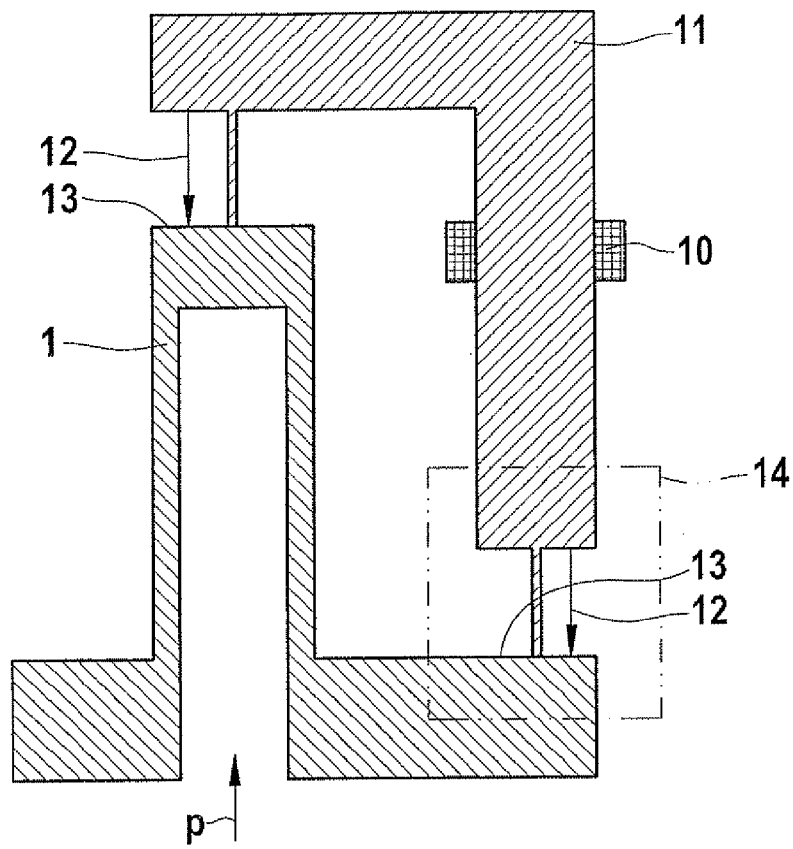
FIG. 3 shows a schematic section through a sensor system having a magnetoelastic deformation element for pressure measurement and an evaluation unit that is connected to a mountable magnetic flux feedback.

FIG. 3 also shows a sensor system having a magnetoelastic deformation element 1 for pressure measurement and an evaluation unit in the form of an evaluation coil 10, which is connected to a magnetic flux feedback 11 that is mountable and closed. Here too, magnetoelastic deformation element 1 as pressure container for measuring pressure p, for instance, on the side of a hydraulic unit, is constructed of a material that demonstrates the magnetoelastic effect and has a permeability change in response to having pressure applied to it. Flux feedback 5, in this context, is located on the side of the evaluation unit, having an appropriate electronic system, not shown here, and is first of all constructed completely separately from deformation element 1.

For the evaluation of the permeability changes in deformation element 1 by a pressure change, evaluation coil 10 is wound around flux feedback 11, and, so as to be able to put the sensor system into operation, the magnetic circuit is closed by mounting flux feedback 11, as is indicated by arrows 12. The permeability change in the region of deformation element 1 thereby becomes measurable as the permeability change in the entire closed magnetic circuit. For evaluation coil 10, the coil inductance, that is evaluated by the postconnected electronic evaluation unit, changes with the permeability change in the region of deformation element 1.

A decisive feature in the implementation of this sensor system according to the present invention, in this context, is the quality of flux feedback 11 in the region of contact surfaces 13 between the sensor unit or hydraulic unit and the evaluation unit. In one implementation of contact surfaces 13 as flat areas, as indicated in FIG. 3, gaps set-in in response to the occurring tolerances, which are able to influence the quality of flux feedback 11 negatively.

Figure 4:
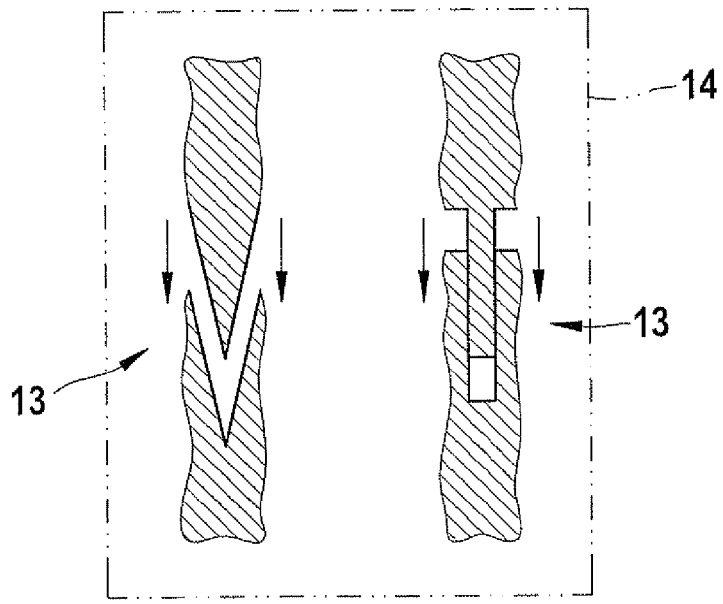
FIG. 4 shows two specific embodiments of the connection of the parts of the flux feedback according to FIG. 3 during mounting.

In a detail section 14 according to FIG. 4, possible, more advantageous implementation forms of contact surfaces 13 are pointed out. Both specific embodiments are based on selecting as large as possible an area for the contact, and furthermore, contact surfaces 13 should not be oriented exclusively in one spatial direction, which permits positional tolerances in different directions. A wedge-shaped development of contact surface 13 is shown in the left part of FIG. 4, and a rod-shaped one is shown in the right part. In the rod-shaped development in the right part of FIG. 4, for instance, the vertical walls are closed even in the represented, not yet finally pushed-in position.

Figure 5:
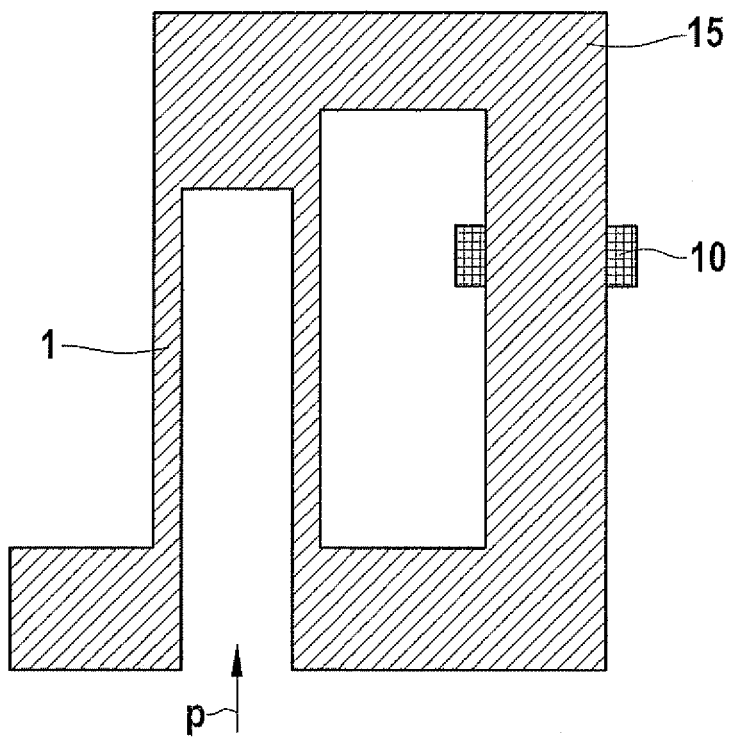
FIG. 5 shows a schematic section through a sensor system having a magnetoelastic deformation element for pressure measurement and an evaluation unit that is connected to a magnetic flux feedback, which bears a subsequently wound-on evaluation coil.

An additional specific embodiment of the sensor system according to the present invention, as in FIG. 5, is based on the idea that, by contrast to the example according to FIG. 3, evaluation coil 10 is wound around an already closed manufactured flux feedback 15. The problem of ensuring a sufficiently good flux feedback, described in connection with the embodiment according to FIGS. 3 and 4, is no longer decisive in this instance. In this case, evaluation coil 10 only has to be wound around flux feedback 15. Deformation element 1 as a pressure container, and flux feedback 15 are made as one piece, in this case, and the winding of evaluation coil 10 around the already closed flux feedback 15 then leads to the coupling of the sensor unit and the evaluation unit.

What is claimed is:

1. A sensor system comprising:
   an at least partially magnetoelastic deformation element for measuring pressures, caused by a fluid, that are applied to the magnetoelastic deformation element;
   a magnetic circuit formed via a magnetic flux feedback;
   a sensor unit situated at the deformation element; and
   an evaluation unit having an evaluation coil and being structurally separated from, yet inductively coupled to, the sensor unit.

2. The sensor system according to claim 1, wherein the sensor unit has a sensor coil situated on the deformation element and the evaluation unit has the evaluation coil that is inductively coupled to the sensor coil.

3. A sensor system comprising:
   an at least partially magnetoelastic deformation element for measuring pressures, caused by a fluid, that are applied to the magnetoelastic deformation element;
   a magnetic circuit formed via a magnetic flux feedback;
   a sensor unit situated at the deformation element; and
   an evaluation unit having an evaluation coil and being structurally separated from, yet inductively coupled to, the sensor unit;
   wherein the sensor unit has a sensor coil situated on the deformation element and the evaluation unit has the evaluation coil that is inductively coupled to the sensor coil;
   wherein the sensor coil forms a resonant circuit, using its own parasitic capacitance or using an additional capacitance, which is able to be energized by the evaluation coil in free resonance with strong inductive coupling by the magnetic circuit enclosing the sensor coil and the evaluation coil, a resonant frequency being then able to be determined in the evaluation unit.

4. The sensor system according to claim 3, wherein the resonant frequency is determinable with the aid of a phase zero crossing of an impedance of the evaluation coil.

5. A sensor system comprising:
   an at least partially magnetoelastic deformation element for measuring pressures, caused by a fluid, that are applied to the magnetoelastic deformation element;
   a magnetic circuit formed via a magnetic flux feedback;
   a sensor unit situated at the deformation element; and
   an evaluation unit having an evaluation coil and being structurally separated from, yet inductively coupled to, the sensor unit;
   wherein the sensor unit has a sensor coil situated on the deformation element and the evaluation unit has the evaluation coil that is inductively coupled to the sensor coil;
   wherein the sensor coil forms a resonant circuit, using its own parasitic capacitance or using an additional capacitance, which is able to be energized by the evaluation coil in free resonance with inductive coupling by the magnetic circuit enclosing only the sensor coil, which is weakly coupled to the evaluation coil via an air gap, a resonant frequency being determinable in the evaluation unit.

6. The sensor system according to claim 5, wherein the resonant frequency is determined using at least one of a phase and an amplitude of an impedance of the resonant circuit energized by a variable frequency.

7. A sensor system comprising:
an at least partially magnetoelastic deformation element for measuring pressures, caused by a fluid, that are applied to the magnetoelastic deformation element;
a magnetic circuit formed via a magnetic flux feedback;
a sensor unit situated at the deformation element; and
an evaluation unit having an evaluation coil and being structurally separated from, yet inductively coupled to, the sensor unit;
wherein the sensor unit and the evaluation unit are coupled via the magnetic circuit having the flux feedback, the evaluation coil being wound around the flux feedback, a permeability change effected by an application of pressure to the deformation element, and thus a change in an inductance of the evaluation coil being able to be determined.

8. The sensor system according to claim 7, wherein the flux feedback having an already wound evaluation coil is able to be mechanically inserted into the magnetic circuit.

9. The sensor system as recited in claim 8, wherein the insertion of the flux feedback is able to be effected via a wedge-shaped or rod-hole-shaped connection at contact surfaces.

10. The sensor system according to claim 7, wherein the flux feedback is fixedly connected to the magnetic circuit and the evaluation coil is subsequently wound around the flux feedback.

* * * * *